(12) United States Patent
Kaibach

(10) Patent No.: US 6,579,049 B2
(45) Date of Patent: Jun. 17, 2003

(54) EXPANSION ANCHOR

(75) Inventor: Werner Kaibach, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/020,108

(22) Filed: Dec. 7, 2001

(65) Prior Publication Data

US 2002/0071727 A1 Jun. 13, 2002

(30) Foreign Application Priority Data

Dec. 12, 2000 (DE) .......................................... 100 61 808

(51) Int. Cl.⁷ .......................... F16B 13/04; F16B 13/06
(52) U.S. Cl. .......................... 411/61; 411/60.2; 411/74
(58) Field of Search .............................. 411/60.1, 60.2, 411/61, 62, 32, 74

(56) References Cited

U.S. PATENT DOCUMENTS 4,904,135 A * 2/1990 Barthomeuf et al. ...... 411/61 X
4,971,494 A * 11/1990 Gauthier et al. .......... 411/61 X
5,314,278 A * 5/1994 Weber ...................... 411/74 X
5,419,664 A * 5/1995 Hengesbach et al. ..... 411/74 X
6,309,155 B1 * 10/2001 Huang ....................... 411/60.2

FOREIGN PATENT DOCUMENTS

DE         3446158       *   6/1986    ................. 411/61

* cited by examiner

*Primary Examiner*—Neill Wilson
(74) *Attorney, Agent, or Firm*—Sidley Austin Brown & Wood, LLP

(57) ABSTRACT

An expansion anchor to be set in a bore of a constructional component and including an anchor member (1) having, at its end facing in a setting direction, an expansion region (5), a guide region (6) remote from the setting direction end of the anchor member (1), and a transition region (8) located between the expansion (5) and guide (6) regions and having at least one opening (10) and at least one salient tab (12) provided in a region of the opening; and a cone (3) for expanding the expansion region (5) of the anchor member (1).

7 Claims, 1 Drawing Sheet

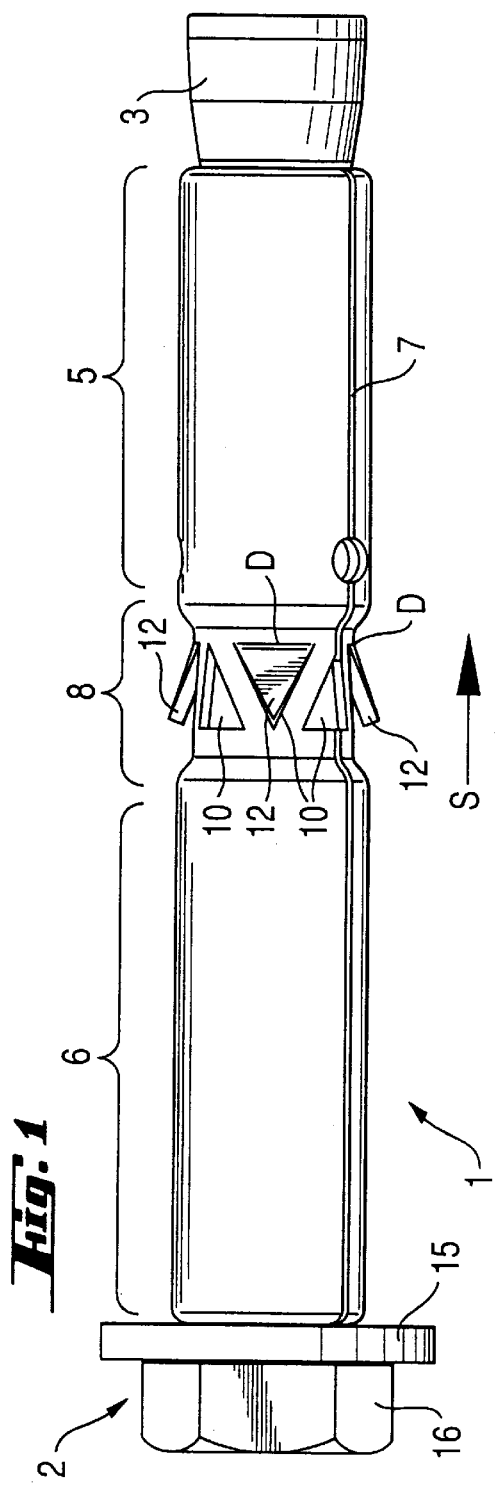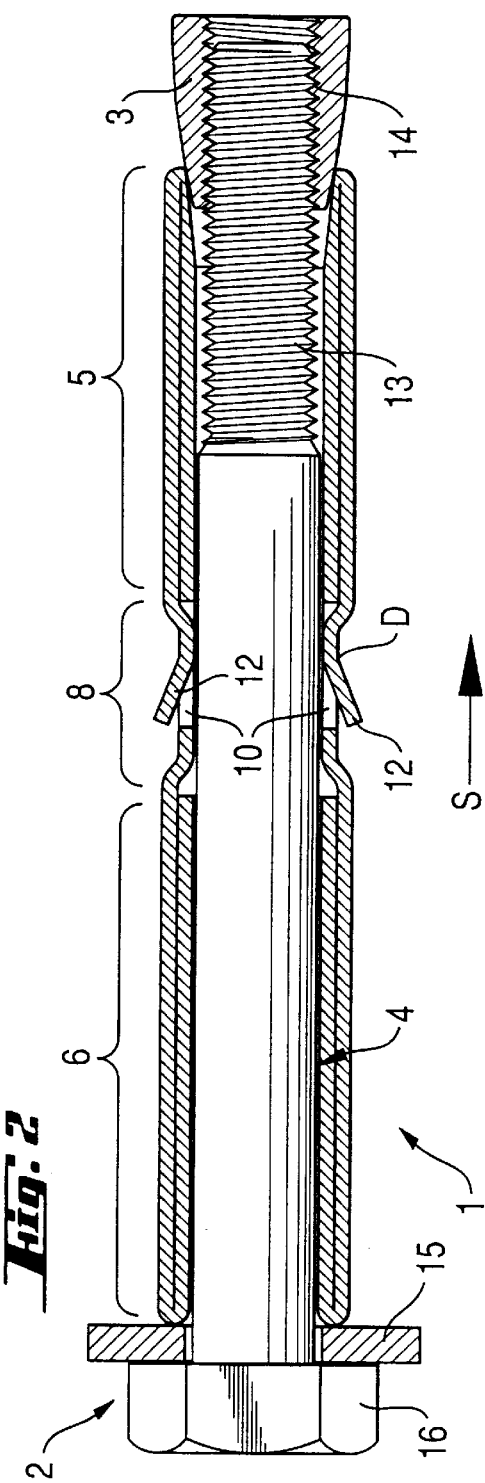

EXPANSION ANCHOR

BACKGROUND OF THE INVENTION

1. Field of the Invention

The present invention relates to an expansion anchor to be set in a bore of a constructional component and including an anchor member having, at its end facing in a setting direction, an expansion region with a longitudinal slot open at its setting direction end, a guide region remote from the setting direction end of the anchor member, and a transition region located between the expansion and guide regions and having at least one opening, at least one radially projecting salient tab for preventing rotation of the anchor member during the setting process, with the expansion anchor further including an expanding member having a cone for expanding the expansion region of the anchor member.

2. Description of the Prior Act

Expansion anchors of a type described above are used in particular for securing an object to a constructional component formed, e.g., of concrete. Usually, a bore is formed in the constructional component for receiving the expansion anchor, in particular, the anchor member. The expanding cone expands the expansion region of the anchor member in the bore, securing the expansion anchor in the bore. In order to prevent rotation of the anchor member during the setting process, the anchor member is provided with at least one salient tab that is engageable in the bore wall. The transition region between the expansion and guide regions serves for obtaining a reliable anchoring in a constructional component formed with cavities, by permitting an axial displacement of the expansion region relative to the guide region. To insure this function, the transition region is provided with a plurality of openings. The openings lead to weakening of the anchoring member resulting in upsetting of the transition region under a certain axial pressure acting on the anchor member.

U.S. Pat. No. 4,720,224 discloses a one-piece expansion anchor having a transition region. The transition region is adjoined, at its setting direction end, by a slotted expansion region and at its opposite end, by a guide region. The transition region is provided with a plurality of openings. In the region of the longitudinal slot of the expansion region, there is provided a plurality of radially extending salient tabs which are engageable in the bore wall, preventing rotation of the anchor member during the setting process. The openings in the transition region allow for an axial displacement of the expansion region relative to the guide region. The openings, as discussed above, lead to an axial weakening of the transition region which results in upsetting of the transition region upon application of a certain axial pressure to the anchor member.

An advantage of the expansion anchor disclosed in U.S. Pat. No. 4,720,224 consists in formation of the anchor member as a one-piece part. This insures an economical manufacturing of the expansion anchor. In particular, an end assembly of the expansion anchor is simplified due to a reduced number of parts.

Drawbacks of the expansion anchor disclosed in U.S. Pat. No. 4,720,224 consist in difficulty of forming the salient tabs, which have to be pivoted outwardly relative to the circumference of the anchor member during manufacturing of the anchor member, and in that the salient tabs do not optimally fulfill their function of preventing the rotation of the anchor member during the setting process, which results in a partial rotation of the anchor member during setting.

Further, the known expansion anchor is practically unsuitable for an overhead work because this expansion anchor can be set only upon application of a significant force. Otherwise, it easily slides out of the bore upon expansion of the expansion region of the anchor.

An object of the present invention is to provide an expansion anchor with a transition region suitable for use in an overhead work.

Another object of the present invention is to provide an expansion anchor of the above-described type that would allow for a simplified formation of the salient tabs.

SUMMARY OF THE INVENTION

These and other objects of the present invention, which will become apparent hereinafter, are achieved by providing at least one opening in the transition region and by forming at least one salient tab in the region of the opening.

Advantageously, there are provided a plurality of openings in the transition region and a plurality of salient tabs formed in the regions of respective openings.

The provision of the salient tabs in the regions of the opening provides for economical manufacturing of the expansion anchor. The economical manufacturing results from the fact that both the openings and the tabs are formed in a single operational step. It is to be pointed out that when several openings are formed in the transition region, not all of them should have a tab.

Advantageously, the openings and the salient tabs have complementary shapes.

Advantageously, the salient tab pivots relative to the opening about an axis located in a plane extending perpendicular to a longitudinal axis of the expansion anchor, and has its free end extending in a direction opposite to the setting direction. The pivotability of the salient tabs and their extension in a direction opposite the setting direction insure an optimal hooking of the tabs in the bore wall.

In order to insure an optimal alignment of the salient tabs with respect to the bore wall, the transition region is formed with a diameter smaller than that of the expansion and transition regions. This makes it possible to increase the salient angle of the tabs in comparison with the angle of the salient tabs of the conventional expansion anchors. Further, the space between the reduced diameter of the transition region and the wall provides sufficient space for accommodating the eventual upsetting of the transition region.

Advantageously, the openings and, accordingly, the salient tabs have a triangular shape. This insures an optimal hooking of the tabs with their sharp tips in the bore wall.

The foregoing feature makes it possible to use the inventive expansion anchor in an overhead work. The anchor can be easily inserted into the bore but would not slide therefrom.

Advantageously, the anchor member is formed as a stamp-bent part of sheet metal.

In order to insure an economical manufacturing of the expansion anchor and, simultaneously, insure stability of the guide and expansion regions of the anchor member, according to a particularly preferred embodiment of the present invention, the wall thickness of the expansion and guide regions is doubled in comparison with the wall thickness of the transition region. In particular, when sheet metal bending-in-stamp process is used, preferable, the sheet metal can be folded once in the guide and expansion regions to obtain the desired thickness of these regions.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 1 a side view of an expansion anchor according to the present invention; and FIG. 2 a longitudinal cross-sectional view of the expansion anchor shown in FIG. 1.

DETAILED DESCRIPTION OF THE PREFERRED EMBODIMENT

An expansion anchor according to the present invention, which is shown in FIGS. 1–2, includes a sleeve-shaped anchor member 1, an expanding member 4, and a load application element 2 provided at the end of the expansion anchor facing in a direction opposite to the setting direction S.

The sleeve-shaped anchor member 1 has, at its end facing in the setting direction, an expansion region 5 with a longitudinal slot 7 open at its setting direction end, a guide region 6 remote from the setting direction end and designed for guiding the expansion anchor in a bore of a constructional component (not shown), and a transition region 8 provided between the expansion and guide regions 5 and 6.

The expanding member 4 includes a bolt 13 and an expanding cone 3 screwed on a threaded, setting direction end 14 of the bolt 13 and designed for expanding the expansion region 5 of the expansion member 1.

The load application element 2 includes a washer 15 that becomes preloaded against an end surface of the anchor member 1 facing in direction opposite to the setting direction S with a nut-like element 16 upon rotation of the nut-like element 16 in a direction that results in pulling of the expansion cone 3 into the bore of the expansion member 1.

The transition region 8 has, in its center or middle region, a plurality of triangular openings 10 uniformly distributed over the circumference of the transition region 8. At least two diametrically opposite openings 10 are provided with complementary shaped adjustment tabs 12 the free, peak-shaped ends of which extend in the direction opposite to the setting direction S. The adjustment tabs 12 pivot relative to the respective opening 10 about an axis D. The axis D lies in a plane extending perpendicular to the longitudinal axis of the expansion anchor, as particularly shown in FIG. 1. The transition region 8 has a smaller outer diameter than the remaining portions of the anchor member 1. The peak-shaped ends of the adjustment tabs 12 extend radially at least to the outer contour of the guide region 6.

As particularly shown in FIG. 2, the expansion and guide regions 5 and 6 of the anchor member 1, which is formed of a sheet metal by being bent in a stamp, have a double wall thickness in comparison with that of the transition region 8.

Though the present invention was shown and described with reference to the preferred embodiment, such are merely illustrative of the present invention and are not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. An expansion anchor for being set in a bore of a constructional component, comprising an anchor member (1) having, at an end thereof facing in a setting direction, an expansion region (5) with a longitudinal slot (7) open at a setting direction end thereof, a guide region (6) remote from the setting direction end of the anchor member (1), and a transition region (8) located between the expansion (5) and guide (6) regions and having at least one opening (10) and at least one salient tab (12) provided in a region of the opening; and an expanding member (4) having a cone (3) for expanding the expansion region (5) of the anchor member (1).

2. An expansion anchor according to claim 1, wherein the salient tab (12) has a shape complementary to a shape of the opening (10).

3. An expansion anchor according to claim 1, wherein the salient tab (12) pivots relative to the opening (10) about an axis (D) located in a plane extending perpendicular to a longitudinal axis of the expansion anchor, and has a free end thereof extending in a direction opposite to the setting direction (S).

4. An expansion anchor according to claim 1, wherein the at least one opening (10) has a triangular shape.

5. An expansion anchor according to claim 1, wherein the transition region (8) has an outer diameter smaller than an outer diameter of the expansion and guide regions (5 and 6).

6. An expansion anchor according to claim 1, wherein the anchor member (1) is formed as a stamp-bent part.

7. An expansion anchor according to claim 1, wherein the expansion and guide regions (5 and 6) have a thickness corresponding approximately to a double thickness of the transition region.

* * * * *